United States Patent [19]
Cooper

[11] 3,963,231
[45] June 15, 1976

[54] PIPE POSITIONING, ROTATING AND FITTING APPARATUS FOR WELDING

[75] Inventor: Cleveland N. Cooper, Kirkwood, Mo.

[73] Assignee: The Pandjiris Weldment Co., St. Louis, Mo.

[22] Filed: Nov. 25, 1974

[21] Appl. No.: 526,708

[52] U.S. Cl. .............................. 269/45; 29/200 P; 269/130
[51] Int. Cl.² .......................................... B25B 1/20
[58] Field of Search ............ 29/200 P, 272; 269/45, 269/130, 131; 51/236

[56] References Cited
UNITED STATES PATENTS

| | | | |
|---|---|---|---|
| 2,196,623 | 4/1940 | Brewington | 269/130 X |
| 2,451,702 | 10/1948 | Weigand | 269/131 |
| 2,500,204 | 3/1950 | Ronay | 29/200 P |
| 3,019,571 | 2/1962 | Whittenberg | 51/236 |
| 3,669,439 | 6/1972 | Sanchez | 269/130 |

FOREIGN PATENTS OR APPLICATIONS 763,282  12/1956  United Kingdom ................. 269/130

*Primary Examiner*—Harold D. Whitehead
*Attorney, Agent, or Firm*—Cohn, Powell & Hind

[57] ABSTRACT

An apparatus for supporting and rotating pipes, incident to joining two pipe sections into a continuous length by welding, includes a pair of support units positioned adjacent the pipe ends, each support unit including an adjustable idler roll assembly, for supporting adjacent pipes on a base at a predetermined elevation, and a clamp assembly. The clamp assembly of each unit includes a chain disposed about the pipe and adjustably connected at its ends to the base so that a pull can be applied to the chain to clamp and, if necessary, slightly deform the upper portion of the pipes into localized alignment to facilitate accurate tack welding prior to circumferential seam welding of the joint.

5 Claims, 9 Drawing Figures

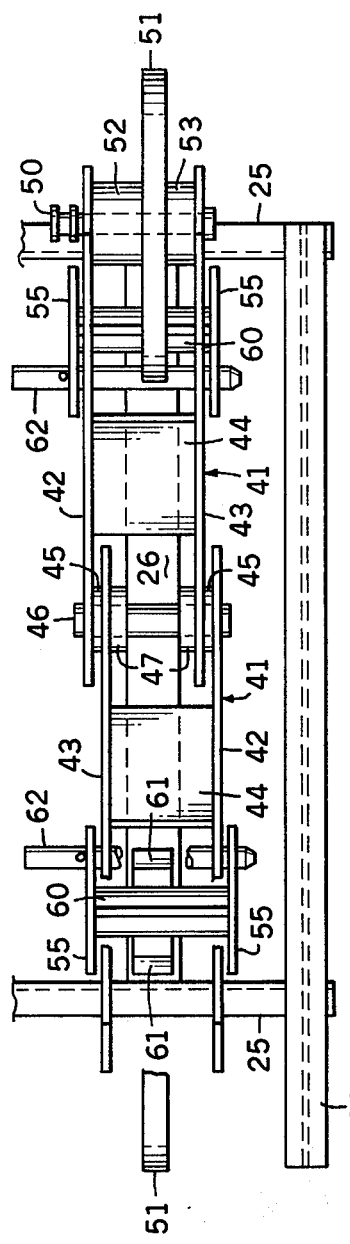
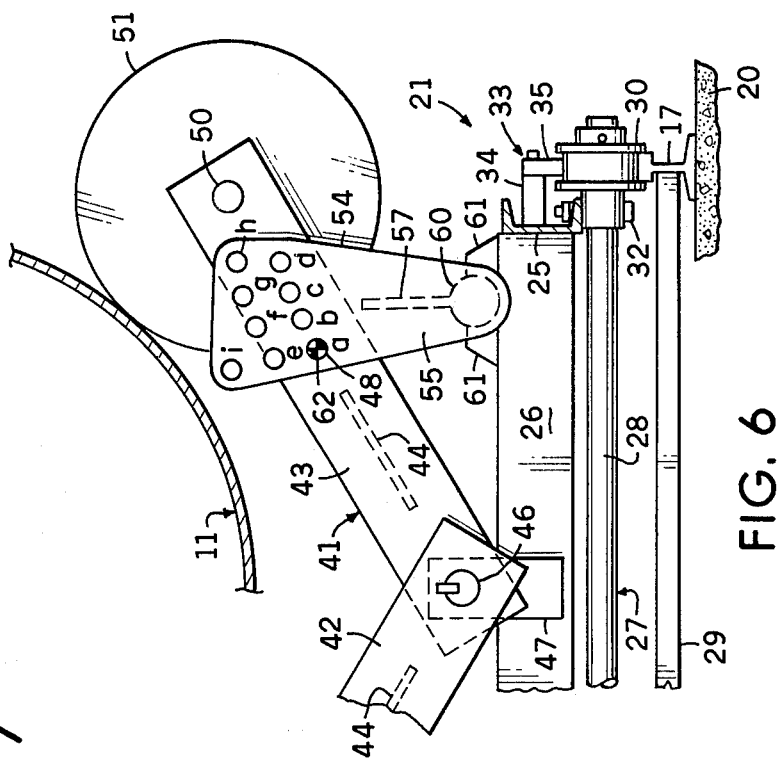
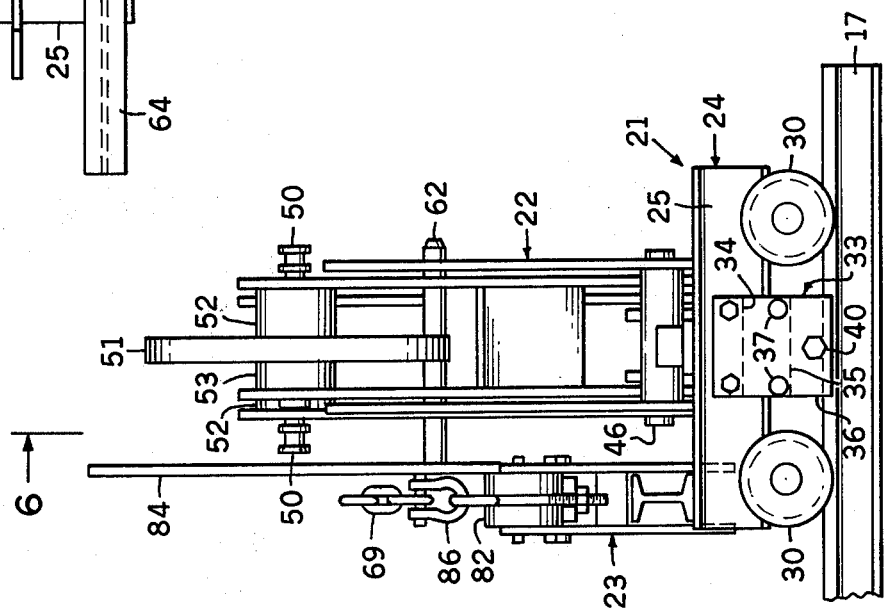
FIG. 7
FIG. 6
FIG. 5

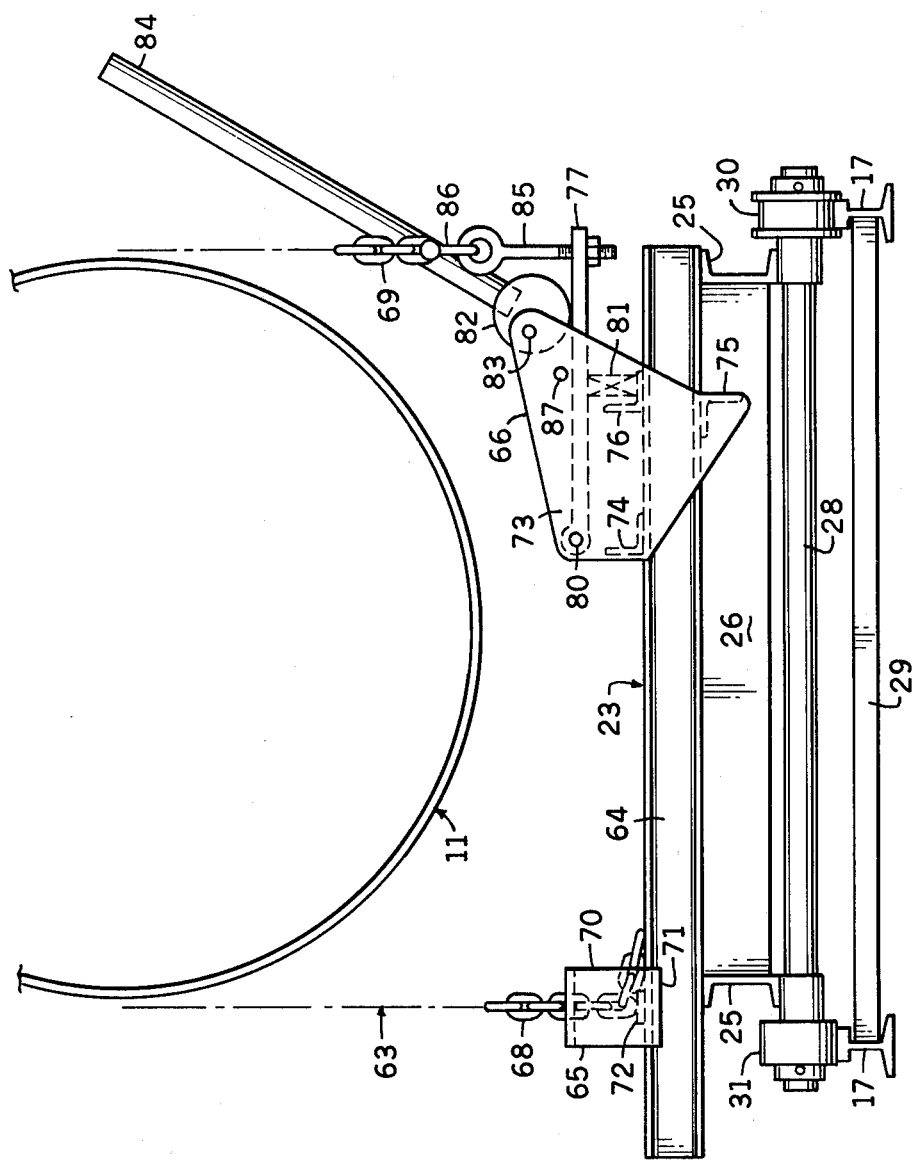
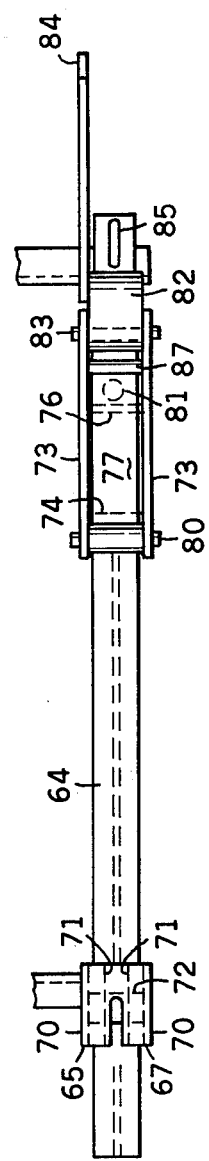
FIG. 8
FIG. 9

PIPE POSITIONING, ROTATING AND FITTING APPARATUS FOR WELDING

BACKGROUND OF THE INVENTION

This invention relates generally to an apparatus for supporting pipe sections together incident to welding the sections into a continuous length, and particularly to support units for providing local alignment of the pipe ends for tack welding.

It is frequently necessary in pipe fabrication work to weld relatively short sections of large diameter pipe together to form a continuous length. Pipes, especially those of the order of fifty inches in diameter, are commonly out-of-round to some extent and no two pipes are identical. The circumferential seam welding of large diameter, thin-walled pipes presents a problem of considerable magnitude in this respect because, when adjacent pipes are rotated on idler rolls, local misalignment of the circumferential joint margins renders accurate welding difficult. For this reason, it is desirable to tack weld the circumferential joint prior to seam welding, and some means must be provided to achieve local alignment of the pipes during the tack welding process. Elevating or lowering the pipes differentially is not a practical method of achieving this alignment.

Another problem inherent in the welding together of relatively large diameter pipes results from the desirability of having idler roll systems capable of catering to a wide range of pipe sizes. Obviously, a roll system which can easily be adapted to suit pipe diameters varying, for example, from 6 to 50 inches is a considerable advantage, but only if the adjustment can be made rapidly; without the use of expensive adjustment mechanisms and without the need for constant elevational adjustment of the pipe rotating means.

The present apparatus solves these and other problems in a manner not disclosed in the known prior art.

SUMMARY OF THE INVENTION

It is an important object of this invention to provide an apparatus for supporting and rotating two pipe sections for welding the sections into a continuous length and for providing a means for circumferentially aligning said pipes by applying a controlled, localized radial clamping force to deform one of the pipes relative to the other to facilitate tack welding of the pipe walls.

Another important object of this invention is to provide idler roll supports for the adjacent pipes to be welded, having adjustment means so that the longitudinal centerline of the pipe is maintained at the same elevation for a wide range of pipe diameters.

An important object is to provide a pair of support units at the ends of adjacent pipes, each support unit including a base and a pair of transversely spaced support rolls mounted on the base, and at least one of said units including clamping means carried by the base for applying a transverse force to the carried pipe, said transverse force tending to urge said pipe end into engagement with its associated support rolls to move said end relative to said other pipe and align said pipe walls for tack welding.

Yet another object is to provide each of the support units with clamping means consisting of a chain assembly embracingly disposed about its associated pipe, said clamping means including first and second connection means connecting said chain ends to the base at transversely spaced points on the base, one of said connection means including means applying a pull to said chain assembly.

Another important object is to provide spaced chain connection means, each of which includes a saddle movably mounted to the base, one of said saddles including a pivotally mounted, spring-loaded lever and a pivotally mounted cam means engageable with the lever to rotate said lever relative to the base and apply a pull to the chain assembly.

Yet another object is to provide an adjustable roll assembly for each unit including a pair of transversely disposed, oppositely extending roll arms, pivotally mounted in swinging relation to the base, and including adjustment means holding said arms at a selected angle of inclination.

An important object is to provide roll arm adjustment means which includes yoke members pivotally mounted to the base and having a plurality of connection points disposed in spaced radial relation from said yoke pivot point, said points being selectively connectible to said roll arm at a common connection point to determine the angle of inclination of said arms.

It is an important object of this invention to provide a support apparatus which is relatively inexpensive to manufacture, simple to operate and which is highly efficient in aligning pipes for initial tack welding the pipe joint at intermittent, circumferentially spaced points incident to seam welding the joint at a later stage.

BRIEF DESCRIPTION OF THE DRAWINGS

FIG. 3 is a fragmentary cross-sectional view illustrating a modified chain assembly;

FIG. 5 is an enlarged side elevational view of a truck-mounted support unit;

FIG. 6 is a fragmentary cross-sectional view taken on line 6—6 of FIG. 5 illustrating the roll assembly;

FIG. 7 is a fragmentary plan view of a truck-mounted support unit shown in FIG. 5 illustrating the roll assembly but omitting the clamp assembly;

FIG. 8 is an enlarged end of the support unit shown in FIG. 5 illustrating the clamp assembly; and FIG. 9 is a plan view of the clamp assembly shown in FIG. 8.

DESCRIPTION OF THE PREFERRED EMBODIMENT

Figure 1:
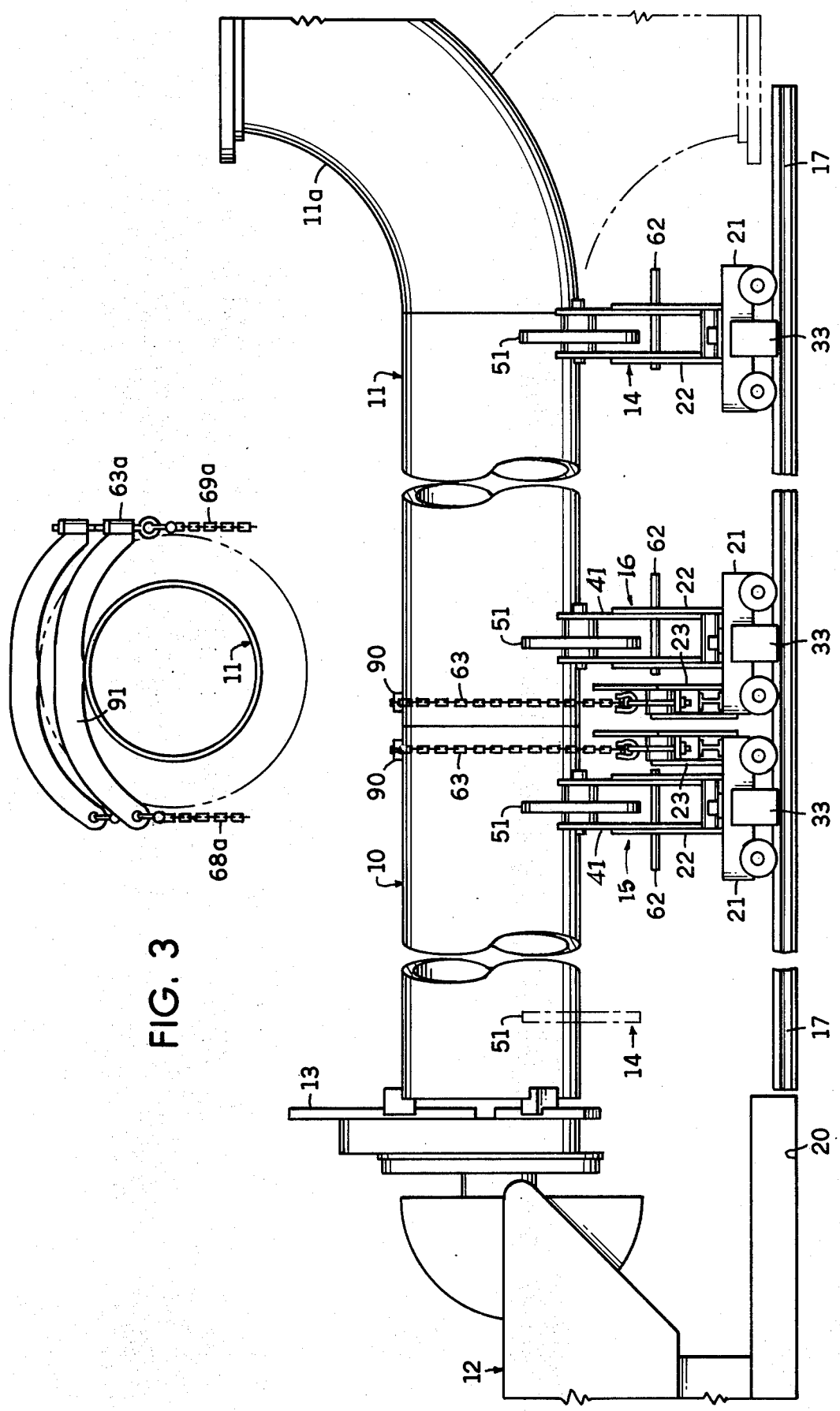
FIG. 1 is a longitudinal elevational view illustrating the apparatus in use during the positioning of pipes for tack welding.

Referring now by characters of reference to the drawing, and first to FIG. 1, it will be understood that the apparatus to be described is intended to support and rotate longitudinally adjacent pipes 10 and 11 incident to the welding together of said pipes into a continuous length.

The apparatus includes generally a positioner 12, provided with a rotatable chuck 13 for gripping the near end of the pipe 10; an idler roll support unit 14 for supporting the far end of pipe 11 and a pair of intermediate idler roll units 15 and 16 for supporting the adjacent ends of pipes 10 and 11 which are to be welded together. Specifically, the idler roll units 15 and 16, which constitute first and second support units, provide a means of applying a transverse deforming force to the adjacent pipe ends to insure localized alignment of adjacent pipe walls to facilitate accurate tack welding of said walls at circumferentially spaced points prior to the seam welding of the joint.

The positioner 12 in the embodiment shown is mounted to the shop floor 20. The center line of the chuck 13 therefore defines the elevation of the longitudinal center line of the pipe 10 held by the chuck 13, and the center line can be maintained at a constant elevation over a wide range of pipe sizes. The positioner 12 provides a means of rotating the pipes 10 and 11 supported on the idler rolls of the end support unit 14 and the intermediate support units 15 and 16.

The end and intermediate support units 14, 15 and 16 are substantially identical in that each includes a rail-mounted truck 21 constituting a base means and an adjustable idler roll assembly 22 constituting a pipe support means. Each of the intermediate support units 15 and 16, in addition, includes an adjustable pipe clamp assembly 23 which provides a means of applying a transverse force to the pipe carried by the associated support unit tending to urge the pipe into engagement with its associated rolls and to move the cantilevered end of the pipe downward sufficiently to bring it into local alignment with the adjacent pipe end for tack welding the pipe ends together. Support unit 16, shown in FIGS. 5–9, will be described, it being understood that end support unit 14 is identical except that the clamp assembly 23 is not provided, and that support unit 15 is substantially identical except that the clamp assembly 23 is adapted to be mounted on the opposite end of the truck 21.

The truck 21, which provides a mobile mounting for the roll and clamp assemblies 22 and 23 is best described with reference to FIGS. 5, 6 and 7. As shown, the truck 21 includes a frame 24 having a substantially H-configuration defined by opposed channels 25 interconnected, as by welding, by a transverse member 26. A pair of wheel assemblies 27 are provided, each including an axle 28 and rail-engaging wheels 30 and 31. The wheel assemblies 27 are mounted to associated channels 25 by means of fasteners 32 and the wheels 30 and 31 are identical except that wheels 30 are flanged to insure that the truck 21 is retained in correct alignment on the rail 17. The truck 21 is provided at one side with a rail locking assembly 33 consisting of an outwardly projecting element 34 welded, or otherwise attached, to the channel 25, and a depending bracket 35 having spaced side elements 36 connected thereto by fasteners 37. The flanking elements 36 are provided with a transverse clamping bolt 40 so that they can be clamped against the rail 17 and thereby effectively lock the truck in a desired longitudinal location. Transverse connector bars 29 extending between the rails 17 insure that the rails 17 are correctly spaced and laterally supported.

The roll assembly 22 includes a pair of transversely disposed, oppositely extending roll arms 41 formed from side plates 42 and 43 interconnected by a web plate 44. Each plate 42 includes a spacer washer 45 welded to the inside face at the inner end, and the arms 41 are pivotally connected to the truck frame 24 by means of a pivot pin 46 extending between lugs 47 which are welded, or otherwise attached, to each side of the truck frame transverse member 26. The roll arms 41 are apertured at their outer end to receive a removable shaft 50, the shaft 50 providing a means by which a roll 51 is mounted to the arm 41. The rolls 51 are provided with spacer washers 52 and 53 of unequal thickness to compensate for the offset nature of the arm connection, and to insure that the rolls 51 are transversely aligned with each other. In the embodiment shown, metal rolls are used. However, it is to be clearly understood that the nature of the support structure readily allows the substitution of rubber-tired rolls where this is desirable.

Each roll arm 41 is supported at the desired inclination by means of an arm or yoke 54. The yoke 54 is pivotally mounted to the truck frame transverse member 26 to support the roll arm 41 at the desired angle of inclination and constitutes an adjustment means. To this end, the yoke 54 is formed from side plates 55 having a web 56 extending therebetween, and the side plates 55 are provided with a plurality of connection apertures indicated collectively by numeral 57 and individually by the letters *a–i*. The pivotal mounting of the yoke 54 is provided by a pivot element 60 which extends between and is welded to the side plates 55, and the truck frame transverse member 26 is provided with a pair of blocks 61 at each end which are spaced to receive the yoke pivot element 60 so that the yoke 54 is rotatable relative to the transverse member 26 and yet can be readily removed. In the preferred embodiment, the roll arm 41 is provided with a pair of aligned apertures 48, which are selectively disposed in register with one of the pairs of opposed apertures, e.g. apertures *a* in the illustration, and the yoke 54 is connected to the roll arm 41 by means of a pin 62, which is removably insertable through registered apertures 48 and *a*. It will be understood that the apertures *a* through *i* are radially spaced relative to the center of the yoke pivot element 60 such that they incline the arm 41 at selectively increasing angles and thereby move the center of the roll 51 in an arc toward the center of the supported pipe. Thus, the adjustable roll arms 41 provide a means of maintaining the center of the pipe in a substantially fixed horizontal axis, it being further understood that each inclination increment corresponds to a specific pipe diameter of conventional size.

Turning now to the clamp assembly 23, this is best understood by reference to FIGS. 8 and 9 read in conjunction with FIG. 5. The clamp assembly 23 consists essentially of a chain assembly 63, which is connected at two points to an I-beam cross member 64 extending between the opposed truck frame members 25. The connections to the cross member 64 are provided by saddle connections 65 and 66 respectively constituting first and second connection means. In the embodiment shown, saddle 65 is provided by a box-like member having a slotted upper portion 67 and depending ell-shaped side portions 70 providing inwardly extending lips 71 which are interconnected by a cross member 72. This structural arrangement of parts permits the saddle 65 to be moved transversely on the cross member 64, relative to the longitudinal axis of the pipe 11, and thereby permits the chain assembly 63 to be readily connected to the saddle 65 with the chain portion 68 being perpendicularly oriented relative to the cross member 64.

Figure 2:
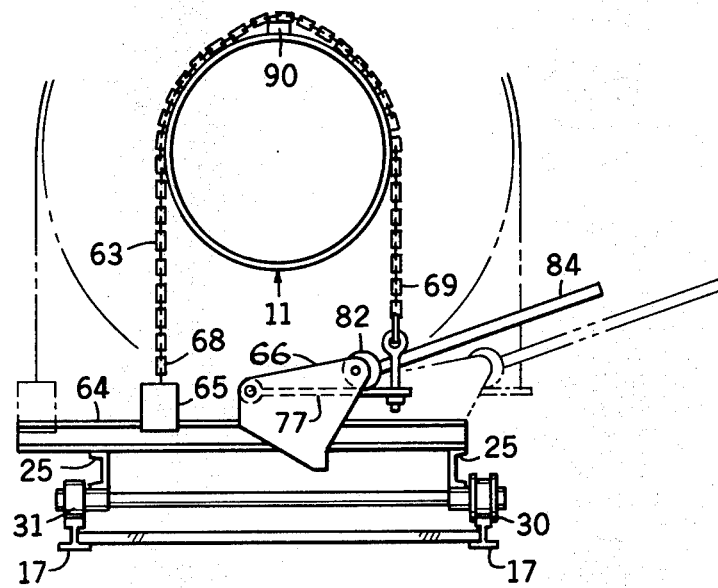
FIG. 2 is a cross-sectional view of the pipe clamp assembly illustrating the positioning of the chain assembly to suit different pipe sizes.

Saddle 66 is also movable on the cross member 64 and, in addition, provides adjustment means by which a pull may be applied to the chain end portion 69. The saddle 66 includes a pair of side plates 73 interconnected by members 74, 75 and 76, which permits the saddle 66 to be moved transversely along the cross member 64. The pull is applied to the chain end portion 69 by means of a cam and spring-mounted lever structure. This structure consists essentially of a lever 77, which is pivotally mounted to the side plates 73 by means of a pin 80 and provided with a compression spring 81 disposed between its under surface and the member 76, and a cylindrical cam element 82, which is pivotally mounted to the side plates 73 by means of a pivot pin 83. The pivot pin 83 is offset from its own longitudinal axis, and the cam element includes a handle 84 by which the cam may be rotated about the pin 83. The lever 77 is apertured at its end for connection of the lever 77 to the chain end portion 69 by means of an eyebolt 85 and a U-bolt 86 which are part of the chain assembly 63. A stop pin 87 is provided to prevent rotation of the cam element 82 beyond the maximum throw position and, in addition, to limit upward travel of lever 77 when no force is applied. It will be understood that when the cam 82 is rotated in a clockwise direction about the pivot pin 83 by means of the handle 84, the lever 77 is rotated about the pin 80 thereby exerting a compressive force against the spring 81 and applying a pull to the chain 69 end portion and therefore the chain assembly as a whole. This pull is transferred from the chain assembly 63 to the pipe 11 and tends to urge the pipe 11 downwardly. It is desirable in many instances to provide a localized load-transfer point at the upper portion of the pipe 11. In the embodiment shown in FIG. 2, a wood block 90 is inserted between the pipe 11 and the chain assembly 63. An alternative load transfer means is illustrated in FIG. 3 in which the intermediate portion of the chain assembly 63a includes a cross beam 91 which is connected between chain end portions 68a and 69a. The beam 91 is configurated to provide a concentrated load to the upper portion of the pipe 11 and is sufficiently long to be used for a large range of pipe diameters. This arrangement renders it unnecessary to move the saddles 65 and 66 to achieve a vertical pull to the chain end portions. In order to stabilize the chain assembly when beam 91 is utilized, the beam 91 is so configurated that the center of gravity is below the contact point on the pipe. This permits the beam 91 to be inherently self-righting even though made of comparatively thin material, thereby facilitating handling.

It is thought that the structural features and functional advantages of this apparatus have become fully apparent from the foregoing description of parts, but for completeness of disclosure, the overall operation will be briefly described.

The roll assemblies 22 of each of the roll units 14, 15 and 16 are adjusted to the setting which corresponds to the diameter of pipe to be welded. At this elevation, the rolls 51 are automatically positioned such that the longitudinal axis of the pipes 10 and 11 to be carried by said units is substantially coaxial with the positioner chuck 13. The turcks 21 of each of the roll units 14, 15 and 16 are moved into a support position adjacent the end of the pipe which they are to carry, and locked in place in that position by means of the appropriate wheel locking assembly 33. It may be desirable during the initial set-up to provide an additional unit 14 at the end of pipe 10, close to the chuck 13, to facilitate the attachment of this end to the chuck 13. The location of this truck 14 is indicated by the phantom outline of roll 51. Once the pipe end is gripped by the chuck 13, the roll assembly of this truck can be retracted.

Figure 4:
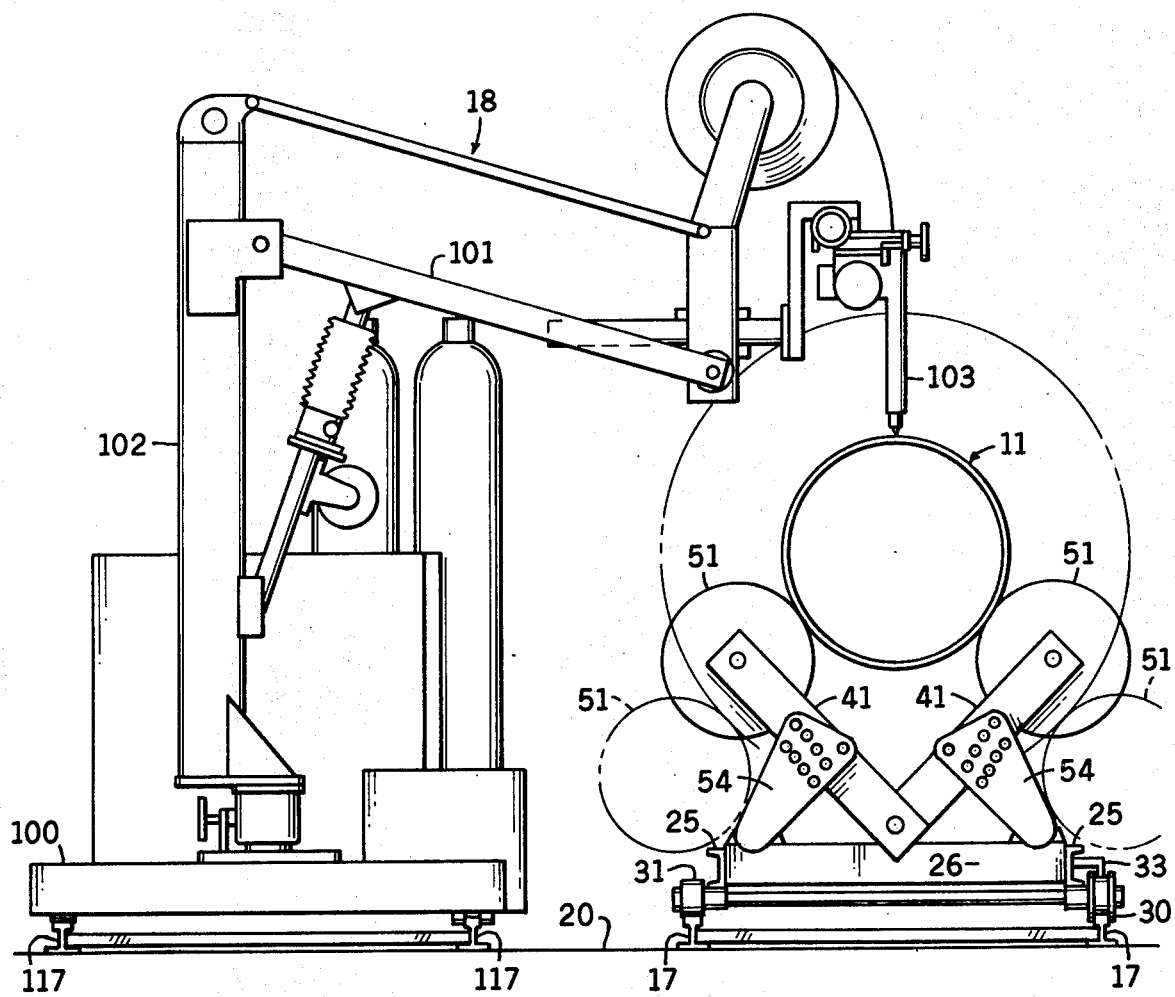
FIG. 4 is a cross-sectional view of the roll assembly illustrating the positioning of the rolls to suit different pipe sizes and illustrating the relative location of the seam welding apparatus following tack welding.

As will be readily understood by reference to FIG. 6, the elevation of roll 51 corresponding to the diameter of the specific pipe to be welded is achieved by pivoting the roll arms 41 about the pivot pin 46 and rotating the yokes 54 about their pivot elements 60 until each arm aperture 48 is in register with the corresponding yoke aperture, for example aperture a in the illustration. Once such registration is achieved, the pin 62 is inserted to hold each roll arm 41 at the correct inclination. FIG. 4 indicates that the inclination of the roll arms 41 can be adjusted to accommodate a large range of pipe sizes. It will be understood that this range can be increased if desired by the substitution of a pair of yokes of different lengths provided with a different set of connection apertures.

As shown in FIGS. 8 and 9, the saddles 65 and 66 are located along the length of the cross member 64 so that the pull on the end portions of each of the chain assemblies 63, disposed about the pipes 10 and 11, is substantially vertical. A wood block 90 is inserted between each chain assembly 63 and the upper portion of the corresponding pipe to apply a downward force at this location when the chain assembly is tightened. The slotted configuration of saddle 65 (see FIG. 6) permits an initial coarse adjustment of the chain length to be made at chain end portion 68 and an infinitely fine adjustment is provided at the chain end portion 69, by virtue of the eyebolt 85. The function of the spring 81 is to raise the lever 77 against the stop 87 and, through the medium of the lever 77 to hold the cam element 82 and the handle 84 in the starting position of minimum throw prior to rotation of the handle 84. This structural arrangement of parts permits the operator to set up the chain assembly without having to hold up the lever 77 at the same time. Further, the fine adjustment feature permits the chain assembly 63 to be initially set so that the cam element 82, which is not lubricated, is frictionally locked sufficiently to resist opposing torque resulting from chain tension. The clamping action can thereby be maintained without the continued exertion of pressure by the operator on the handle 84. The pipes are tightly clamped in position by rotating associated handles 84 in a clockwise direction so that the cam element 82 exerts an increasing pressure against the spring mounted lever 77 and therefore the chain end portion 69. The spring 81 tends to resist the downward movement of the lever 77, reduces load on the lever pin 80 and increases the frictional resistance of the cam element 82 to inhibit counterclockwise movement. Any relative misalignment between the upper portions of the pipe is corrected by simply applying additional force to the pipe 10 or 11 having the higher elevation to draw it downwardly until local alignment of the pipe walls is achieved. At this point, the pipes 10 and 11 can be tack welded together preferably by manual welding. The clamp assembly 23 can then be released to permit the now partially connected pipes 10 and 11 to be rotated through say 120° to a new position. The pipes 10 and 11 can be again clamped and the procedure repeated. When sufficient tack welds have been applied, the clamp assemblies 23 can be released to permit the adjacent ends of the pipes to be seam welded. As shown in FIG. 4, this is preferably accomplished automatically by means of an automatic seam welding device such as the head director manipulator 18. This manipulator 18 is provided with an articulated boom 101 carried by a post 102 and is mounted on a truck 100. The truck 100 is mounted on a laterally adjacent set of rails 117, and the welding rod dispensing assembly of the manipulator 18 indicated by numeral 103 can be held at a constant elevation while the tack welded pipes are rotated by the positioner chuck 13.

I claim as my invention:

1. In an apparatus for supporting and rotating two pipes for welding adjacent ends thereof, an improved support means for aligning said adjacent ends comprising:
   a. a support unit including:
      1. base means, and
      2. support means carried by the base means and including a pair of transversely spaced support rolls engageable by one of said adjacent pipe ends, and
      3. clamping means carried by the base means and including means disposed about said one pipe end for applying a transverse force to said pipe end tending to urge said end into engagement with the support rolls and tending to deform said end relative to said other pipe end to align said pipe ends for welding,
   b. the clamping means including means embracingly disposed about the pipe and having opposed ends, and first and second connection means connecting said ends to said base means at transversely spaced points on said base means, and
   c. one of said connection means including saddle means carried by the base means, lever means pivotally mounted to the saddle means and connected to one end of said pipe embracing means in spaced relation from the lever pivot axis, and cam means pivotally mounted to the saddle means and slidably engageable with the lever means upon pivotally movement of the cam means to rotate said lever means and apply a pull to said one end of said pipe embracing means.

2. An apparatus as defined in claim 1, in which:
   d. the other of said connection means includes a saddle means carried by the base means, said saddle means of said first and second connection means being transversely movable relative to the base means to accommodate pipes of varying diameter.

3. In an apparatus for supporting and rotating two pipes for welding adjacent ends thereof, an improved support means for aligning said adjacent ends comprising:
   a. first and second support units each including:
      1. base means including rail-engaging wheels,
      2. support means including a pair of transversely disposed oppositely extending roll arms pivotally mounted in swinging relation to the base means, each having a pipe engaging roll mounted thereon, and adjustment means holding said arms at a selected angle of inclination, and
      3. clamping means including a chain assembly disposed in embracing relation about an associated pipe and having opposed end portions, and said clamping means including spaced connection means connecting said opposed end portions of said chain assembly to said base means, one of said connection means including means for applying a pull to the chain assembly to apply a transverse force to said associated pipe tending to urge said pipe into engagement with the rolls and tending to deform said pipe end relative to said other pipe end to align said pipe ends for welding,
   b. said connection means between said chain assembly end portions and said base means are transversely movable to accommodate pipes of varying diameter, and
   c. one of said spaced connection means includes saddle means movably mounted to the base means, lever means pivotally mounted to the saddle means and connected to one of said chain assembly end portions in spaced relation from the lever pivot point, and cam means pivotally mounted to the saddle means and slidably engageable with the lever means upon pivotal movement of the cam means to rotate said lever means about said lever pivot point to depress said lever means and apply a pull to said one chain assembly end portion.

4. An apparatus as defined in claim 3, in which:
   f. resilient means disposed between said lever means and said saddle means supports said lever means between said lever pivot point and said connection of said lever means to said one of said chain assembly portions.

5. In an apparatus for supporting and rotating two pipes for welding adjacent ends thereof, an improved support means for aligning said adjacent ends comprising:
   a. first and second support units each including:
      1. base means including rail-engaging wheels,
      2. support means including a pair of transversely disposed oppositely extending roll arms pivotally mounted in swinging relation to the base means, each having a pipe engaging roll mounted thereon, and adjustment means holding said arms at a selected angle of inclination, and
      3. clamping means including a chain assembly disposed in embracing relation about an associated pipe and having opposed end portions, and said clamping means including spaced connection means connecting said opposed end portions of said chain assembly to said base means, one of said connection means including means for applying a pull to the chain assembly to apply a transverse force to said associated pipe tending to urge said pipe into engagement with the rolls and tending to deform said pipe end relative to said other pipe end to align said pipe ends for welding,
   b. a bearing means disposed between the end portions of said chain assembly and engaging a small limited area of said associated pipe to apply a concentrated load to said pipe area.

* * * * *